United States Patent
Ruggiero et al.

(10) Patent No.: US 11,042,220 B2
(45) Date of Patent: Jun. 22, 2021

(54) THREE-DIMENSIONAL INPUT DEVICE

(71) Applicants: Gustavo Mantovani Ruggiero, São Paulo (BR); Ricardo Ganc, São Paulo (BR)

(72) Inventors: Gustavo Mantovani Ruggiero, São Paulo (BR); Ricardo Ganc, São Paulo (BR)

( * ) Notice: Subject to any disclaimer, the term of this patent is extended or adjusted under 35 U.S.C. 154(b) by 0 days.

(21) Appl. No.: 16/530,588

(22) Filed: Aug. 2, 2019

(65) Prior Publication Data
US 2021/0034155 A1    Feb. 4, 2021

(51) Int. Cl.
G06F 3/01       (2006.01)
G09B 23/32      (2006.01)
G06F 3/0346     (2013.01)

(52) U.S. Cl.
CPC .......... G06F 3/016 (2013.01); G06F 3/0346 (2013.01); G09B 23/32 (2013.01)

(58) Field of Classification Search
CPC ..... G06F 3/016; G06F 3/0346; G06T 19/003; G06T 2210/28; A61B 34/76; A61B 2034/742
See application file for complete search history.

(56) References Cited

U.S. PATENT DOCUMENTS

| | | | | |
|---|---|---|---|---|
| 7,084,867 | B1* | 8/2006 | Ho | G06F 3/016 345/419 |
| 2002/0018046 | A1* | 2/2002 | Rosenberg | G06F 3/03545 345/156 |
| 2002/0054060 | A1* | 5/2002 | Schena | G05G 9/047 715/701 |
| 2002/0097223 | A1* | 7/2002 | Rosenberg | G06F 3/016 345/157 |
| 2008/0225007 | A1* | 9/2008 | Nakadaira | G06F 3/03545 345/173 |

FOREIGN PATENT DOCUMENTS

BR    102013024031 A2 * 10/2015
KR    1020110000908 A  *  1/2011

* cited by examiner

*Primary Examiner* — Jeffery A Brier
(74) *Attorney, Agent, or Firm* — B. Aaron Schulman, Esq.; Stites & Harbison, PLLC

(57) ABSTRACT

A three-dimensional input device is disclosed. The input device comprises a tubular handle body, a pointer that extends from within the tubular handle body and that can be retracted into the tubular handle body, and a haptic feedback mechanism which selectively applies resistance to the extension and retraction of the pointer. The resistance applied by the haptic feedback mechanism simulates a sensation of rigidity for the user. The input device can be used to control simulation software such as surgical procedure simulation software.

13 Claims, 5 Drawing Sheets

FIG. 3
FIG. 3a
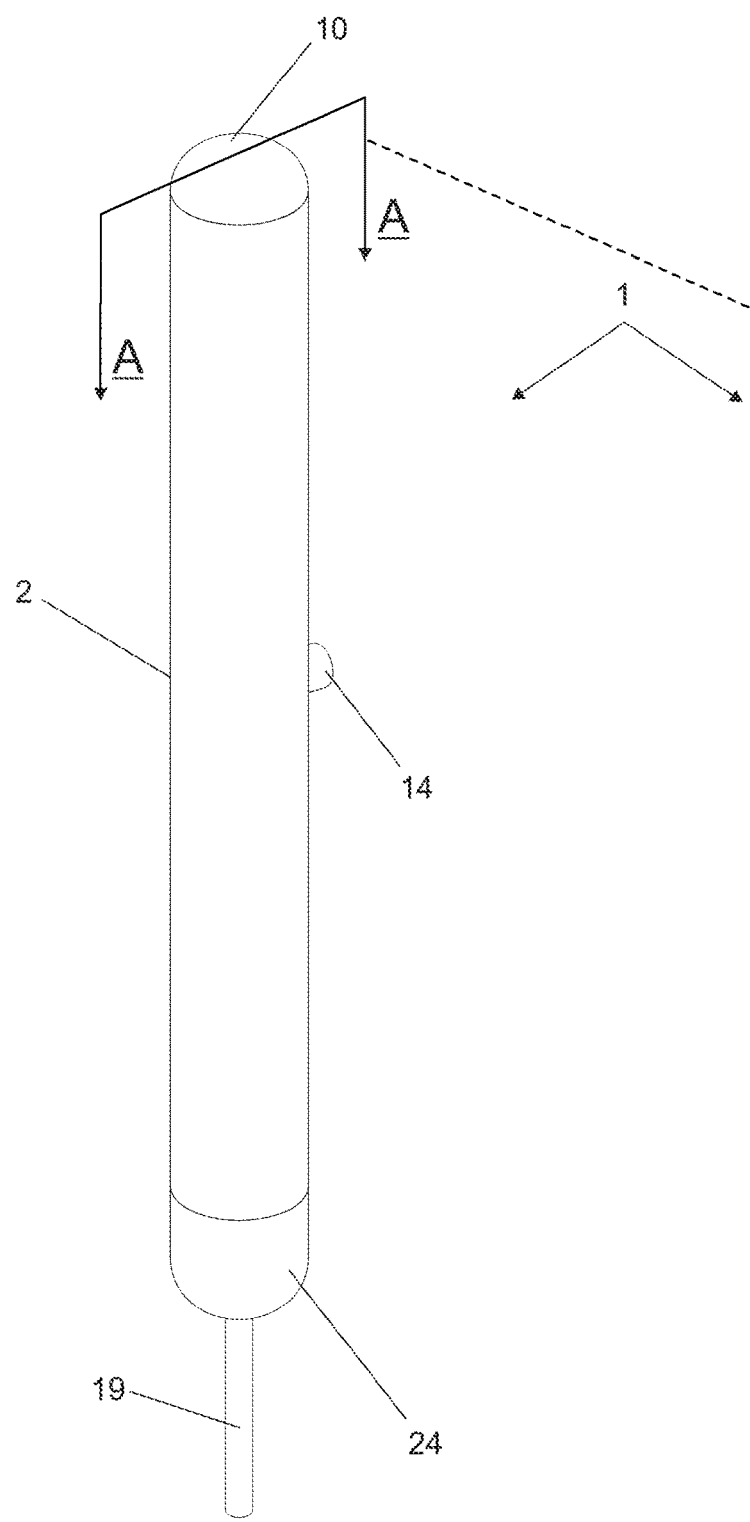
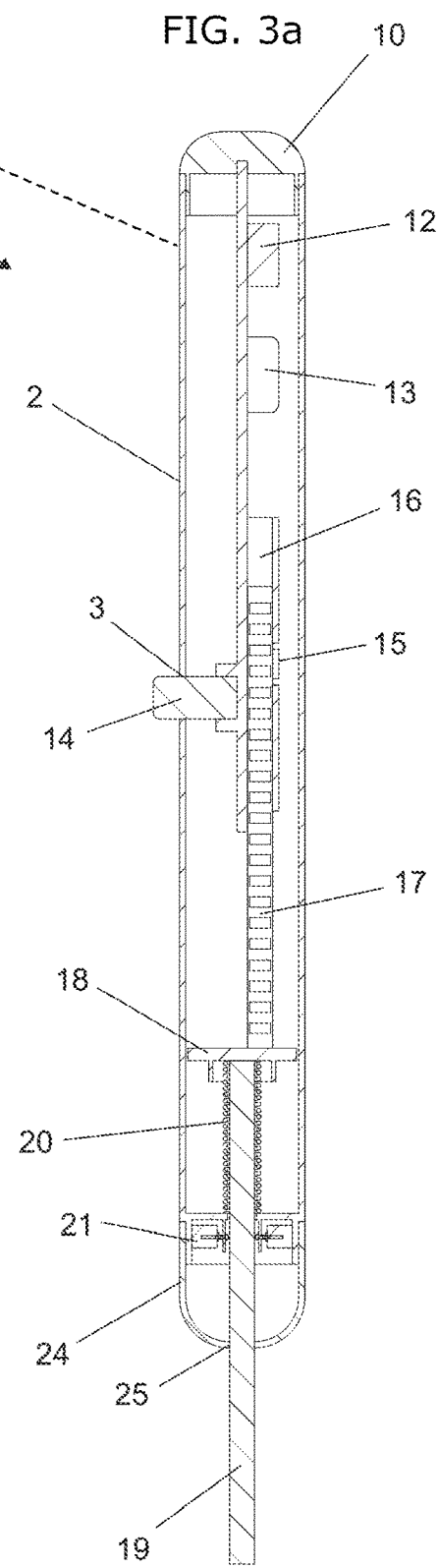

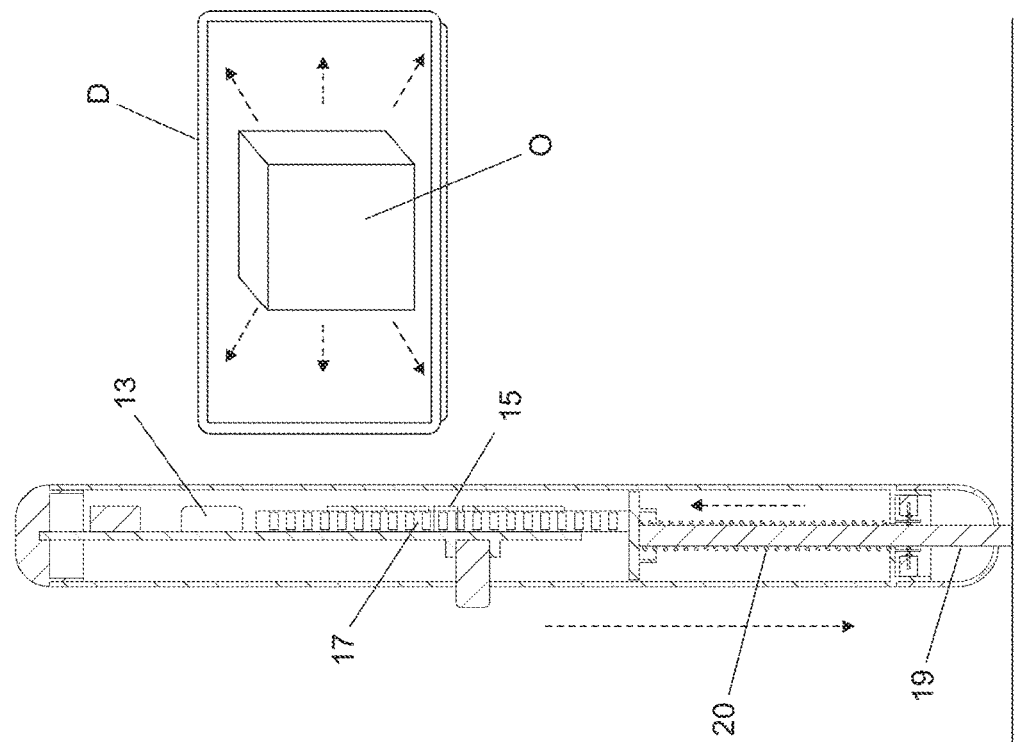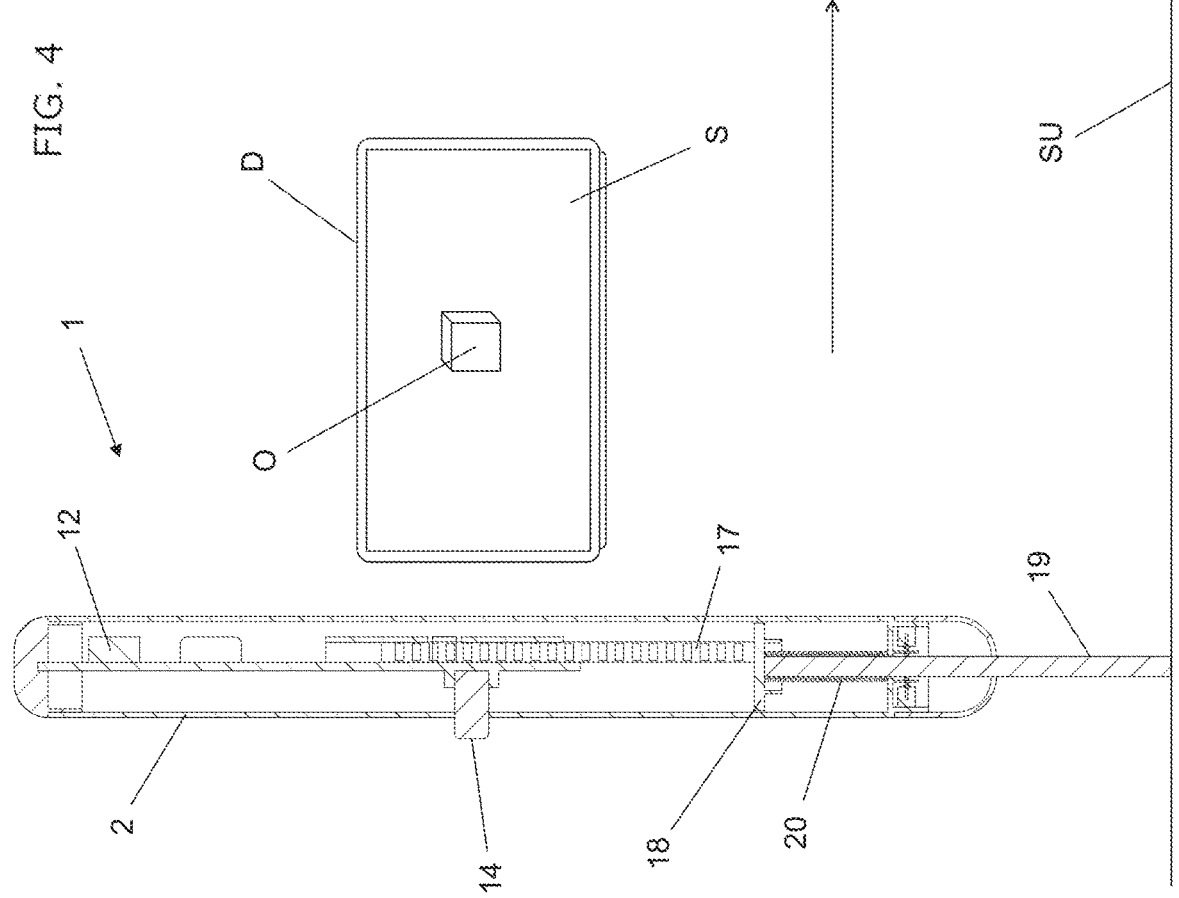

FIG. 5
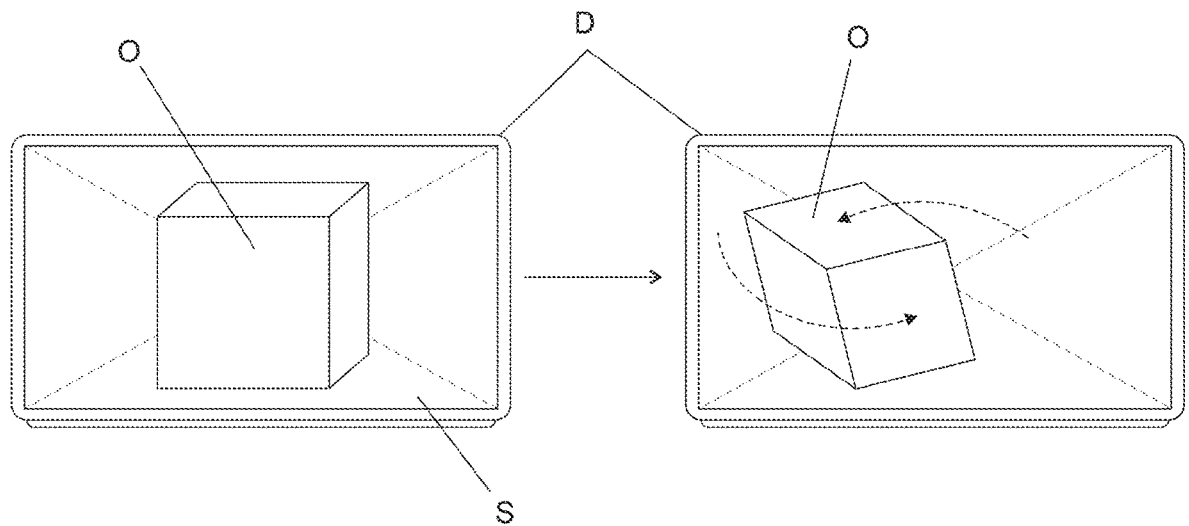
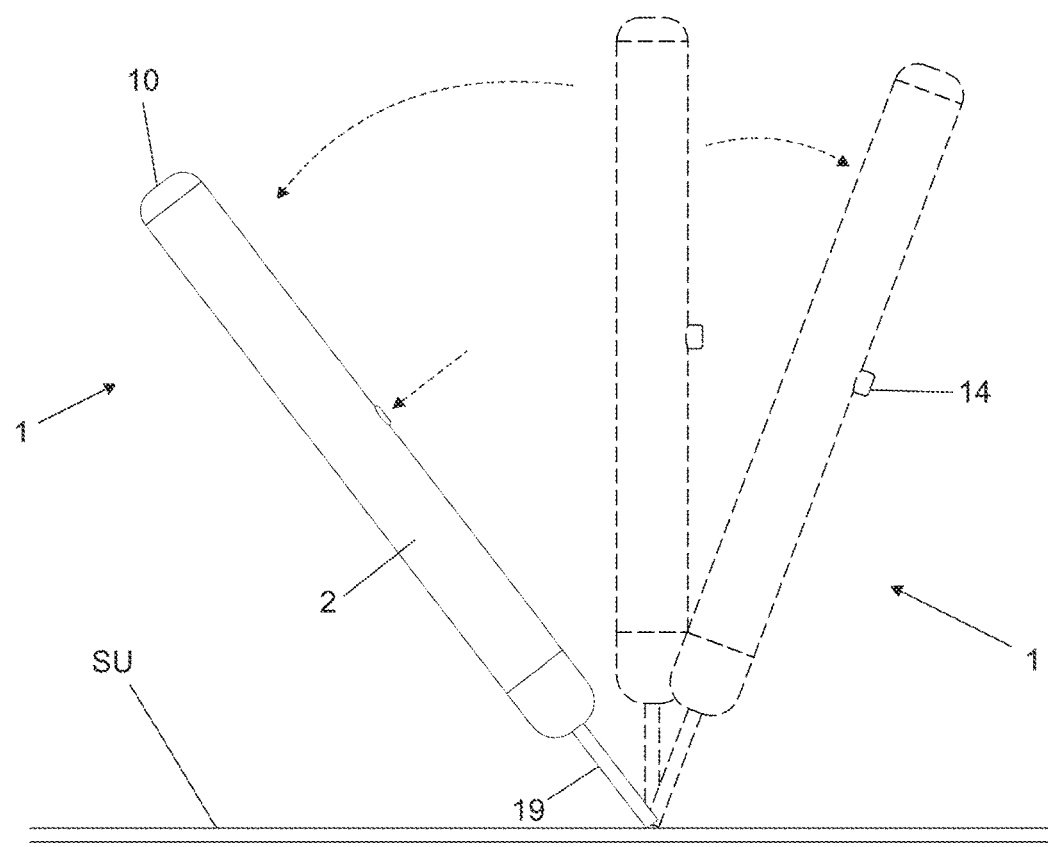

THREE-DIMENSIONAL INPUT DEVICE

FIELD OF THE INVENTION

The present disclosure relates to a portable electronic pen which is a pen-type digital input device to be used with a work surface. It provides a user with three-dimensional input to control software such as medical surgery training software, software for the composition of technical and artistic drawings, software for 3D modeling, simulators, and games.

BACKGROUND OF THE INVENTION

Historically, new surgeons have learned new procedures by performing them in the presence and under the guidance of an experienced surgeon. As such, surgeons, and particularly inexperienced surgeons, must rely on patients appearing with conditions requiring certain procedures in order to have the opportunity to learn those procedures.

Currently, at least in the case of simpler procedures, one solution is that a new surgeon can simulate the procedure using training systems that simulate the anatomy and condition of a patient. Training using simulations is not only useful to teach new physicians, but also for helping experienced physicians maintain their skills by practicing known procedures and learn new procedures.

The medical professions (human and veterinary) rely more and more on digital age tools every day, employing 3D imaging and modeling for diagnosis, surgical training, and virtual dissection. Each year, numerous public and private teaching institutions and hospitals around the world equip their laboratories and surgical centers with 3D multidisciplinary platforms and simulators that show highly detailed and anatomically correct 3D models of all the systems of human and animal bodies. These technologies integrate hospitals and classrooms to offer the student the possibility of studying real clinical cases and tests of patients with full and unrestricted access to the patient's real anatomy.

One problem faced by those interested in this type of technology is that these simulators and the related equipment are extremely expensive due to the complexity of the technology and the demand. Accordingly, only major companies and institutions can afford them, making them inaccessible to individuals, and smaller companies and teaching institutions. As a result of the prohibitive cost, improvements and updates to this type of equipment are rarely sought, which in turn slows the evolution of the technology.

Less expensive simulation technology exists, but it offers a relatively low-precision simulation. It does not allow the depth of interaction desired, often restricting the user's experience to theoretical and visual studies such as touch screen interaction with software.

Kinaesthetic communication technology (often called haptics) is known to the art and refers to any technology that can create or simulate an experience of touch, typically by applying forces, vibrations, or motions to the user. Haptic feedback more specifically relates to haptic experiences of touch triggered by the user's use of the device. For example, a device might provide haptic feedback using vibrations to simulate the sensation of pressing a button in response to a user pressing down on a specific area of the device meant to serve as a button.

BRIEF DESCRIPTION OF THE INVENTION

With a view to solving or mitigating the aforementioned problems with existing simulation equipment, here is provided a portable electronic pen-type digital input device suitable for, inter alia, controlling simulation software.

The device is compact and simulates a realistic handling experience of medical and surgical instruments at a lower cost than existing surgical simulation equipment. It is therefore suitable for entities that cannot afford the more expensive existing equipment such as small and medium-sized companies and institutions. The device, combined with surgery simulation software, allows the user to familiarize themselves with and practice medical procedures and possible clinical problems. It may therefore improve the user's skill in the future performance of that procedure or other procedures on a real patient.

The simple construction of the device and its ergonomic and portable shape ensure a relatively low final cost, allowing students and professionals to purchase and carry the equipment, for example, to class or to work thus improving access to simulation time for the individual.

The device's compact size, portability, and affordability also make it suitable for many uses beyond surgical procedure simulation. It can be adapted for use in other fields such as 3D modelling, computer games, and simulations that benefit from a 3D input device.

BRIEF DESCRIPTION OF THE DRAWINGS

FIG. 3 is a perspective view of the device depicting plane "A".

FIG. 3a is a cross-sectional view of the device cut along plane "A" showing the arrangement of the internal components.

FIG. 4 is a sequential cross-sectional view of the device first with the pointer in the extended position and second with the pointer pressed into a retracted position.

FIG. 5 is a diagram showing a digital object moving in accordance with the angular and rotational movement of the device.

DETAILED DESCRIPTION OF THE INVENTION

Example embodiments will hereinafter be described in detail with reference to the accompanying drawings.

Figure 1:
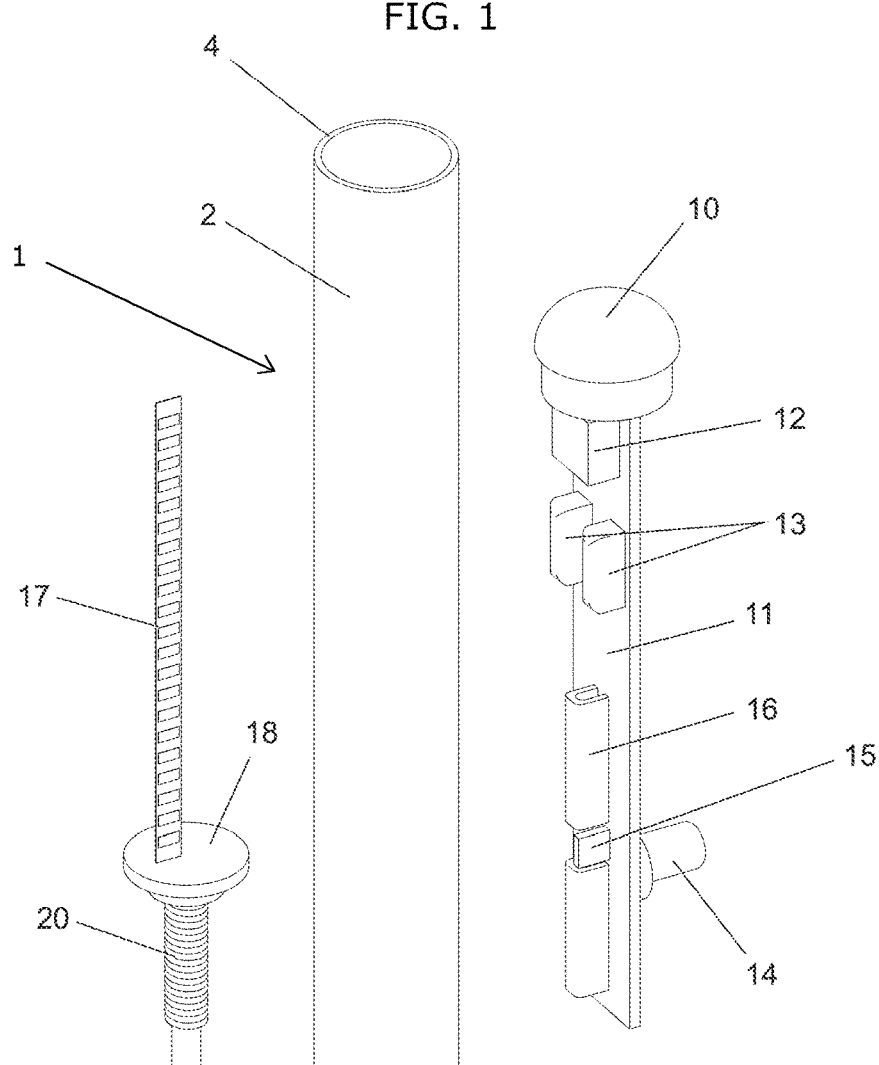
FIG. 1 is an exploded view of the device showing its internal and external components.

FIG. 1 is an exploded view of a three-dimensional input device (1) according to one embodiment. The three-dimensional input device (1) comprises a tubular handle body (2) defining an intermediate hole (3) (visible in FIG. 3a) as well as an upper nozzle (4). The upper nozzle (4) of the tubular handle body (2) is closed by a lid (10). A control circuit board (11) is fixed to the lid (10) and extends inside the tubular handle body (2).

The control circuit board (11) comprises a wireless adapter (12), one or more accelerometers (13), an actuator button (14) which extends through the intermediate hole (3) of the tubular body (2), and an encoder (15). The encoder (15) is fixed between a pair of guides (16).

The guides (16) house a movable tape-scale (17), which is fixed to a discoid base (18) of a pointer (19) such that when the pointer (19) retracts or extends, the movable tape-scale (17) slides within the guides (16). The pointer (19) houses a tension spring (20).

A cylindrical neck (9) is closed by a lower lid (24) having a hole (25) through which the pointer (19) extends.

Figure 2:
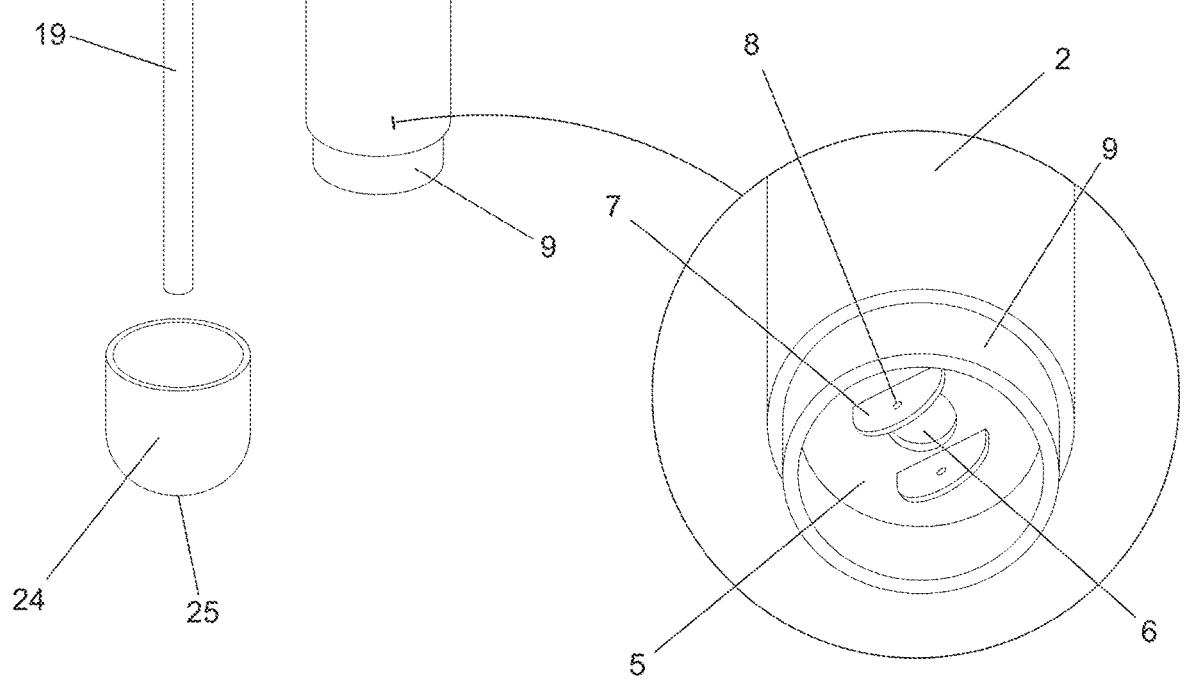
FIG. 2 is an enlarged view of detail "A" of FIG. 1, showing a lower view of the tubular body.

FIG. 2 is an enlarged partial view of FIG. 1 according to one embodiment. The tubular handle body (2) is closed at the bottom by a stop (5) having a central hole (6). A pair of bearings (7) are fixed on opposing sides of the central hole (6), and the bearings define a threaded hole (8). A cylindrical neck (9) of a smaller diameter than the tubular handle body (2) extends from the stop (5).

FIG. 3 is a perspective view of a three-dimensional input device (1) according to one embodiment.

FIG. 3a is a cross-sectional view along plane "A" of a three-dimensional input device (1) according to one embodiment. The cross-sectional view shows how the actuator button (14) extends through the intermediate hole (3) of the tubular handle body (2).

Two motors (21) are disposed on opposite sides of the pointer (19), and the tension spring (20) is disposed between the discoid base (18) of the pointer (19) and the stop (5). The pointer (19) extends beyond the central hole (6) of the stop (5) and beyond the hole (25) of the lower lid (24).

FIG. 4 is a sequential cross-sectional view of a three-dimensional input device (1) according to one embodiment first showing the pointer (19) in extended position, and second showing the pointer (19) in the retracted position.

When the pointer (19) is pressed against a work surface (SU), it retracts into the tubular handle body (2), thus sliding the movable tape-scale (17) relative to the encoder (15).

In one embodiment, the three-dimensional input device (1) will be used together with a surgical procedure simulation software programmed to recognize the three-dimensional input device (1) by wireless connection using the wireless adapter (12). The software will be installed in the personal electronic device (D) of a user such as a desktop computer, notebook, or tablet.

When the three-dimensional input device (1) is pressed against the work surface (SU), its pointer (19) pushes the discoid base (18) and the movable tape-scale (17) upwards, tensioning the tension spring (20). These vertical movements of the tape-scale (17) are recognized and read by the encoder (15), which sends signals to the software (S). The software (S) then moves a virtual object (0) closer or further away from the screen in accordance with the movement of the pointer (19) as indicated by the movement of the tape-scale (17) relative to the encoder (15).

The user can activate the actuator button (14) to interact with the virtual object (0), which can represent an organ, part of the human body, or something else.

FIG. 5 is a diagram of a three-dimensional input device (1) according to one embodiment. Rotational and axial movements of the three-dimensional input device are read by the accelerometers (13) and interpreted by the control circuit board (11). The software (S), in communication with the control circuit board (11), synchronizes these movements with the rotational and axial movements of the virtual object (0). Controlling the orientation of the virtual object (0) permits the user to inspect the virtual object (0) from different angles, in order to find the desired point interaction through the actuator button (14).

Figure 7:
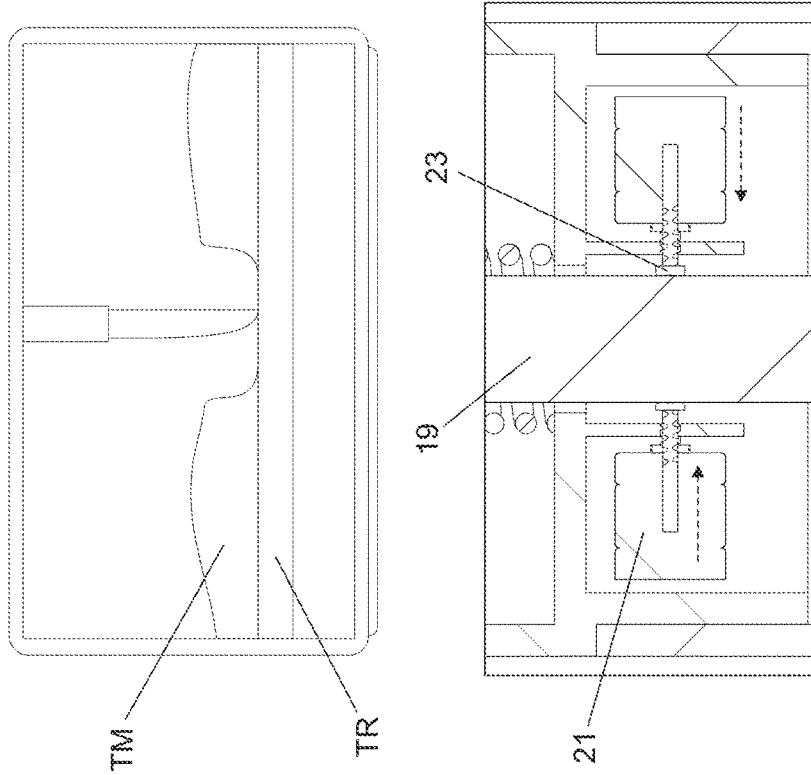
FIG. 7 is a sectional view of the haptic feedback mechanism offering maximum resistance to the movement of the pointer.
Figure 6:
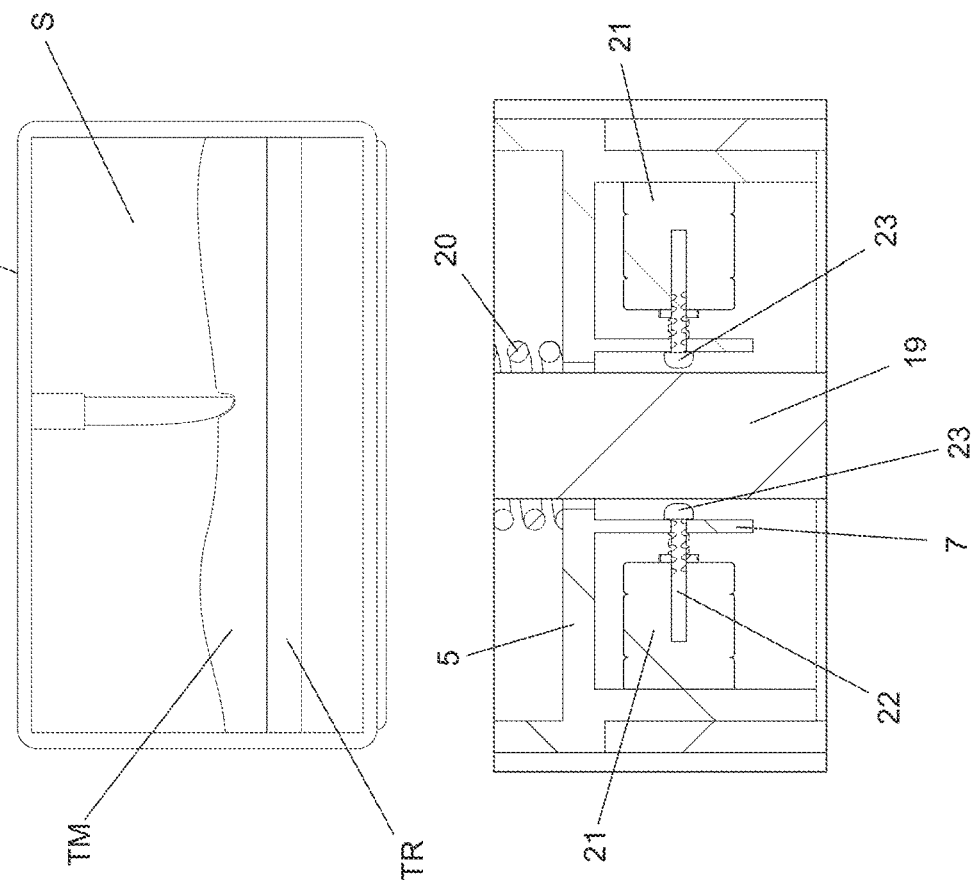
FIG. 6 is a sectional view of the haptic feedback mechanism offering no resistance to the movement of the pointer.

FIGS. 6 and 7 are diagrams of a haptic feedback mechanism of a three-dimensional input device (1) according to one embodiment.

FIGS. 6 and 7 show two motors (21), each having a threaded shaft (22) extending through a threaded hole (8) (visible in FIG. 2) of each bearing (7) of the stop (5). The threaded holes (8) extend perpendicular to the central hole (6) (visible in FIG. 2) of the stop (5) and perpendicular to the surface of the pointer (19). The threaded shafts (22) each have a rubber tip (23).

When a user interacts with a virtual object in the software, the software (S) can send signals to the control circuit board (11) to engage the motors (21). When engaged, the motors (21) rotate the threaded shafts (22) within the threaded holes (8), thus extending the rubber tips (23) of the threaded shafts (22) toward the pointer (19) to engage the pointer. In this way, the software (S) can progressively increase the resistance of the pointer (19) retraction to a maximum compression point of the rubber tips (23) against the pointer (19), the resistance corresponding to a rigidity of the virtual object.

The variable resistance provides haptic feedback to the user that simulates the sensation of the rigidity of the virtual object.

FIG. 6 depicts a user interacting with a virtual soft tissue (TM), the motors (21) lightly engaging the pointer (19) with the rubber tips (23) of the threaded shafts (22) to create an appropriately small or zero amount of resistance in order to simulate the rigidity of the soft tissue.

FIG. 7 depicts a user interacting with a virtual rigid tissue (TR), the motors (21) the strongly engaging the pointer (19) with the rubber tips (23) of the threaded shafts (22) to create a large amount of resistance in order to simulate the rigidity of the rigid tissue.

Therefore, through the three-dimensional input device (1) described herein, a realistic and precise relationship between movements of a user and a virtual object (0) of the software (S) is made possible. This provides an immersion in the virtual environment for analyses and simulations of surgical procedures.

It will be understood that the invention is not limited to the specific resistance mechanism of the embodiments. Any mechanism for providing resistance to the pointer can be used. For example, instead of motors (21) fixed to the bearings (7) to increase resistance to the retraction of the pointer (19), the three-dimensional input device (1) could employ a pneumatic or hydraulic system through a piston, or an electromagnetic system through a microcoil combined with a solenoid.

Example embodiments have been described above. The present disclosure is not at all limited to such embodiments. The present disclosure can of course be built in various ways without departing from the spirit of the disclosure.

What is claimed is:

1. A three-dimensional input device comprising:
a tubular handle body;
a pointer retractably extending from the tubular handle body;
a position sensor in communication with the pointer for detecting a position of the pointer relative to the tubular handle body;
a haptic feedback mechanism in operable connection with the pointer to variably resist the extension and retraction of the pointer;
one or more motion sensors in communication with the tubular handle body for detecting motion of the three-dimensional input device; and
a controller operably connected to the position sensor, the one or more motion sensors, and the haptic feedback mechanism;
wherein the haptic feedback mechanism comprises:
an extendable shaft having a tip of or coated in a material with a high coefficient of kinetic friction; and a controllable extending mechanism in operable communication with the shaft such that the shaft can be extended or retracted;

wherein the shaft is aligned such that when extended, the tip engages a surface of the pointer.

2. The three-dimensional input device of claim 1 further comprising one or more actuator buttons disposed on the tubular handle body.

3. The three-dimensional input device of claim 1 wherein each of the one or more motion sensors comprises one or more accelerometers.

4. The three-dimensional input device of claim 1 wherein the controller is a control circuit board comprising a wireless communication adapter.

5. The three-dimensional input device of claim 1 wherein the position sensor, the haptic feedback mechanism, the one or more motion sensors, and the controller are disposed within the tubular handle body.

6. The three-dimensional input device of claim 1 wherein the controllable extending mechanism comprises a motor and the extendable shaft comprises a threaded shaft of the motor extending through a threaded hole substantially perpendicular to the surface of the pointer.

7. The three-dimensional input device of claim 1 wherein the position sensor comprises an encoder located between a pair of guides that houses a movable tape-scale, the movable tape-scale being fixed to a discoid base of the pointer.

8. A method of controlling a computing device comprising:

connecting the three-dimensional input device of claim 1 to a computing device;

receiving, at the computing device, input signals from the three-dimensional input device; and initiating, in response to receiving the input signals, a responsive action that is associated with the input signals.

9. The method of claim 8 wherein the input signals indicate at least one of a rotational or axial movement of the three-dimensional input device, a position of the pointer, and a change in the position of the pointer.

10. The method of claim 8 wherein the input signal indicates the pointer being retracted or extended, and the responsive action is the corresponding movement of a virtual object closer or further away.

11. The method of claim 8 wherein the input signal indicates axial movement of the three-dimensional input device, and the responsive action is a corresponding axial movement of a virtual object.

12. The method of claim 8 wherein the input signal indicates rotational movement of the three-dimensional input device, and the responsive action is a corresponding rotational movement of a virtual object.

13. The method of claim 8 further comprising:

identifying a rigidity of a virtual object;

generating a haptic feedback signal corresponding to the rigidity of the virtual object; and transmitting the haptic feedback signal to the three-dimensional input device.

* * * * *